United States Patent Office 2,780,452
Patented Feb. 5, 1957

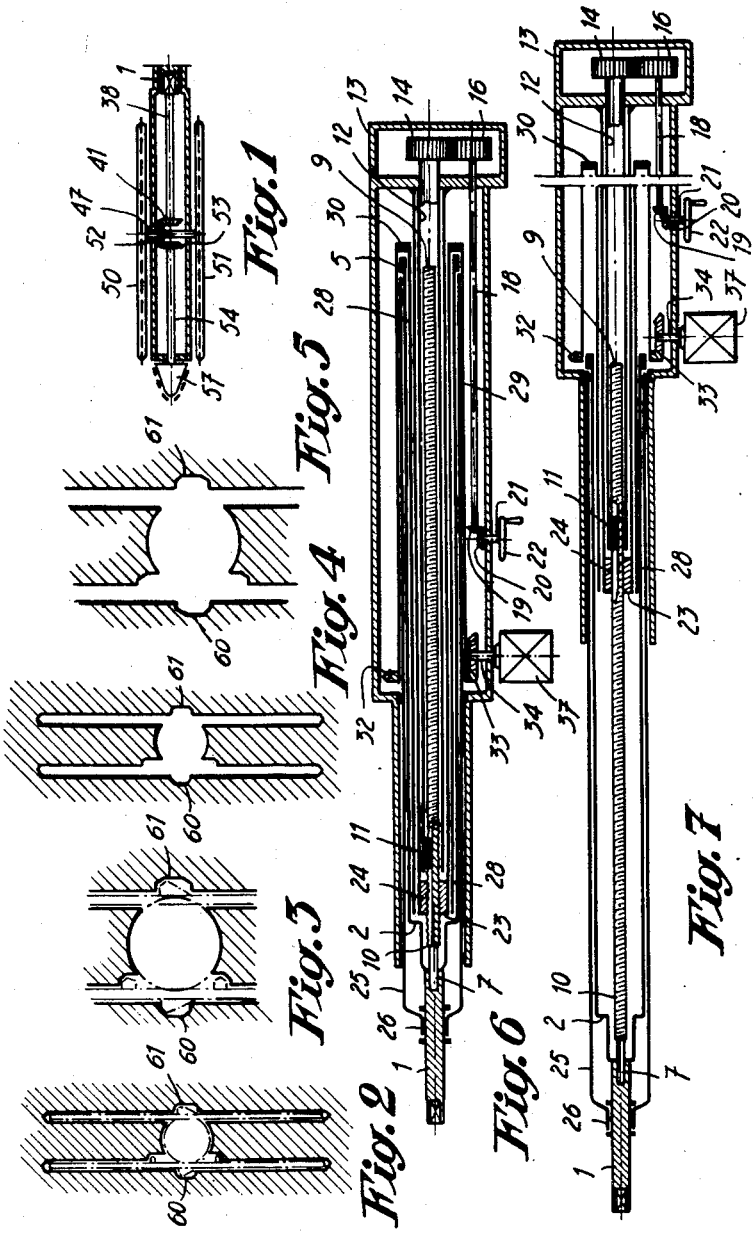

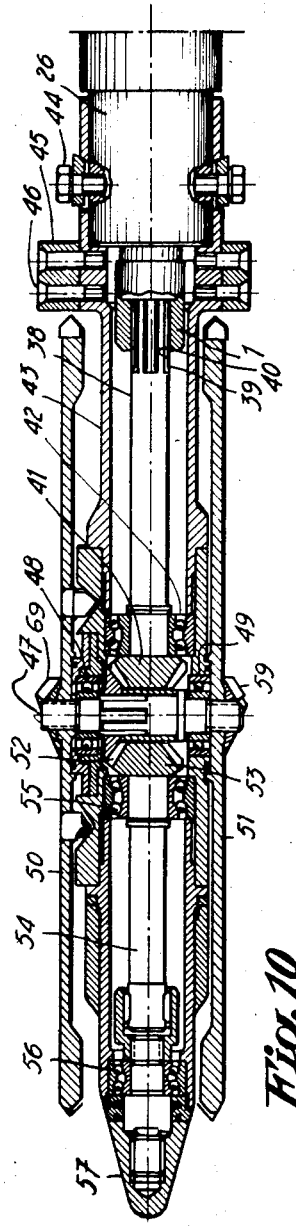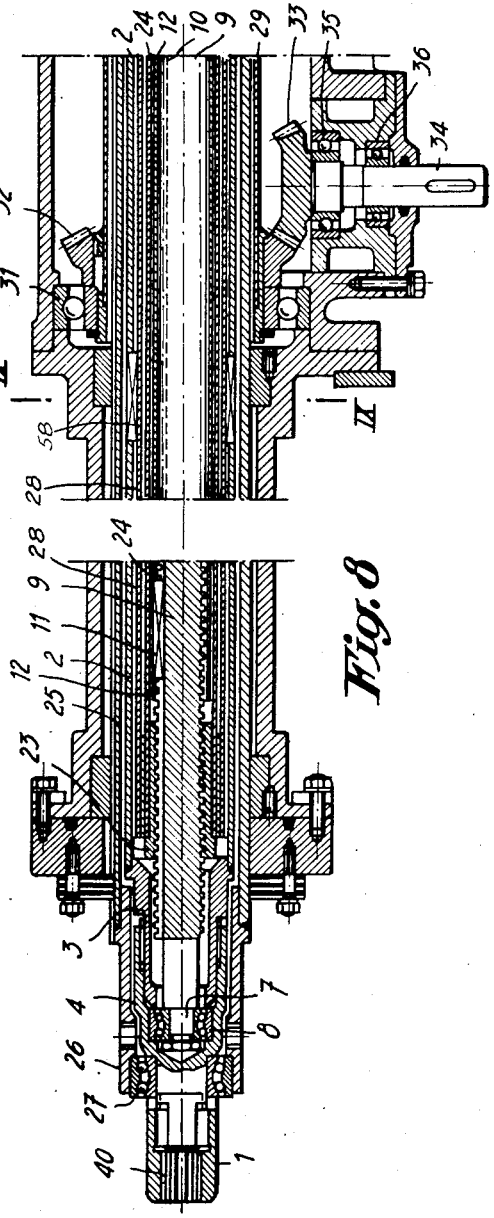

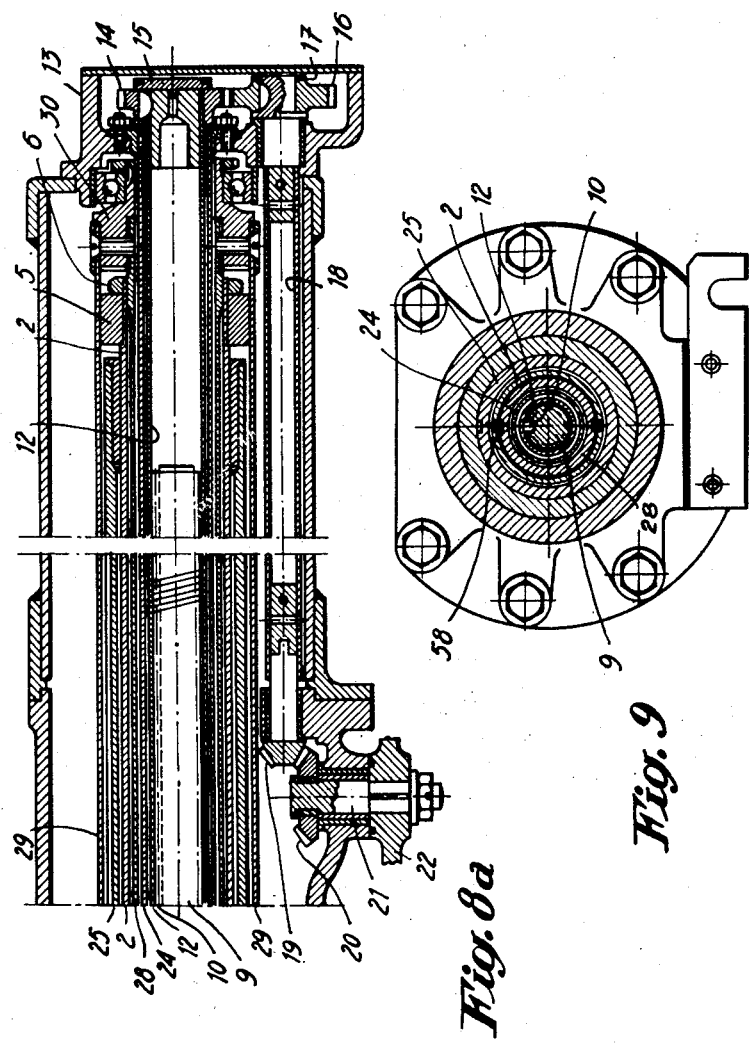

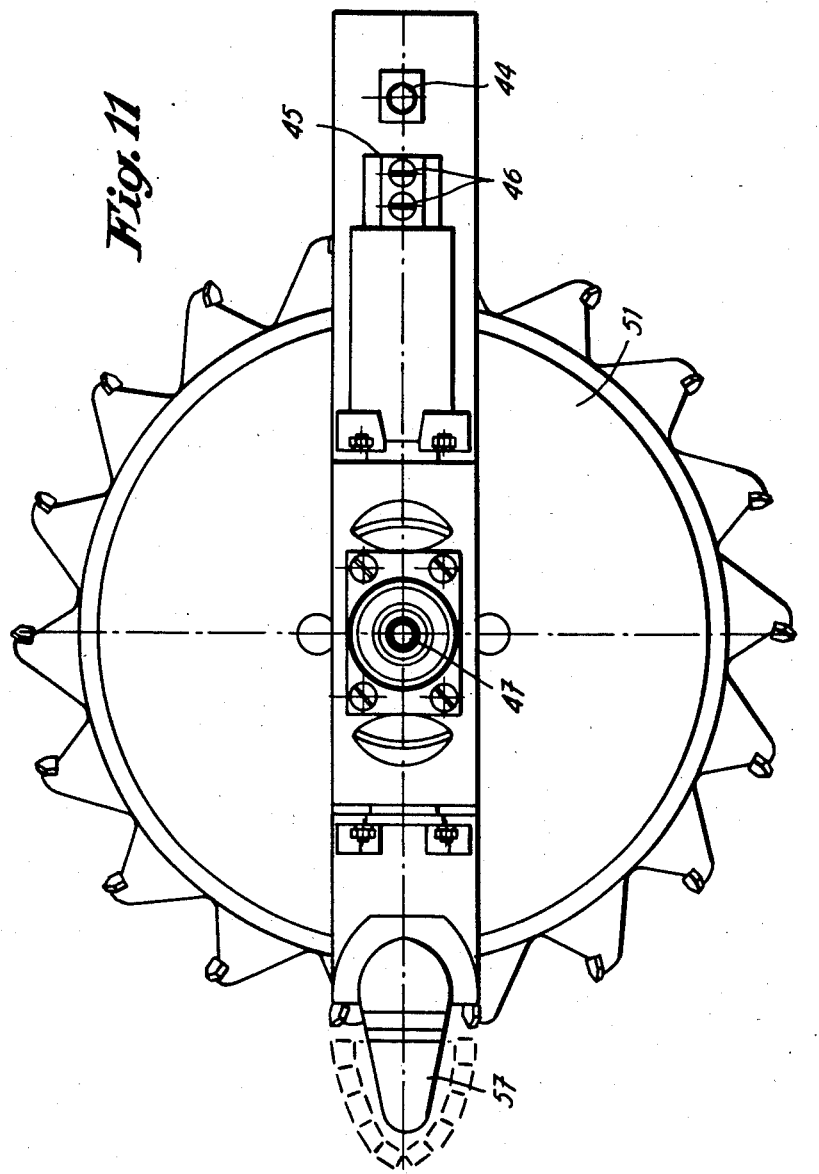

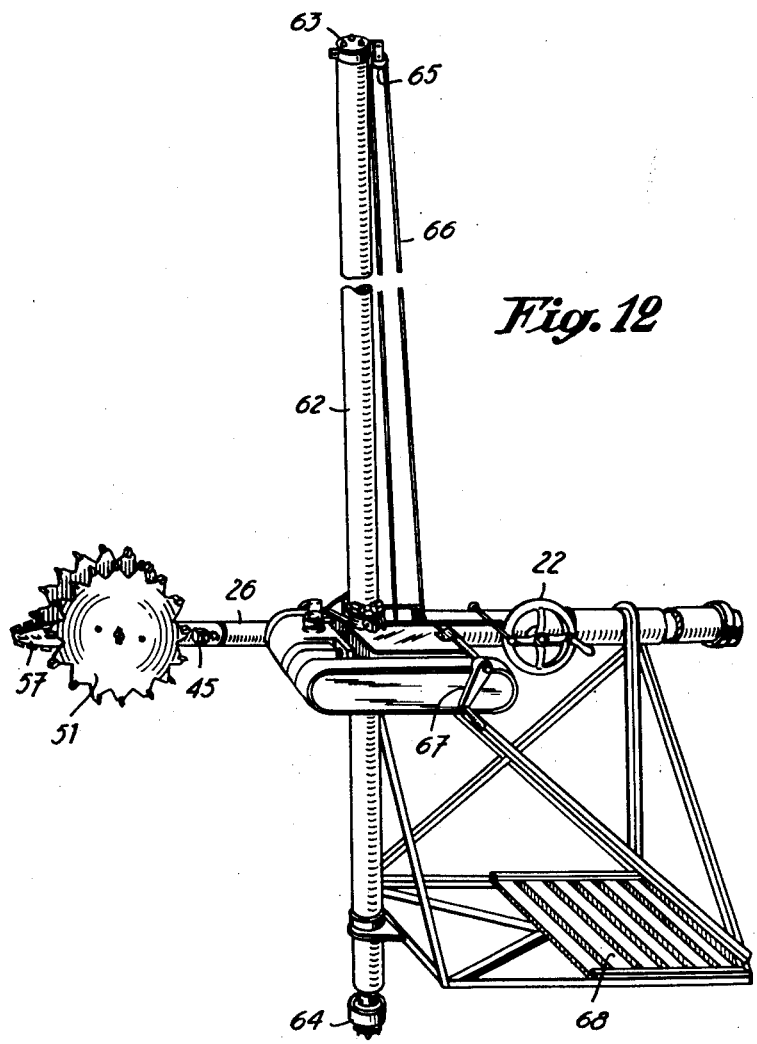

2,780,452

ROCK CUTTING MACHINE HAVING SLOT CUTTING AND SLOT ENGAGING GUIDE MEANS

Paul Marcerou, Paris, France, assignor to "Sonapar" Societe de Participation, S. A., Luxembourg, Grand Duchy of Luxembourg Application March 27, 1953, Serial No. 345,216

Claims priority, application Belgium March 27, 1952

10 Claims. (Cl. 262—9)

The invention relates to a rock cutting machine, suitable for cutting stony materials and more particularly the softer and semi-hard stony materials, in quarries.

The machine is particularly adapted for cutting deeply under stable conditions, notwithstanding that it is relatively of light construction, and thus simple to handle.

The essential features of the machine result from the lateral arrangement of small cutting members for cutting two parallel grooves, and from the arrangement, behind the said cutting members, of side supporting members which are guided in the said grooves so that the head of the machine is supported during advance in the work, thus preventing overhang, and providing good stability for the machine even when the head of the tool penetrates deeply.

Under these conditions the head of the machine is directly supported by the mass which is being operated on and can thus penetrate deeply under good conditions as regards stability, the overhang properly so-called being replaced by a direct support.

The two lateral tools may comprise two small cutters mounted on the ends of the shaft of the side cutters of the machine. The two side supporting members may comprise projections fixed on opposite sides of the tool casing or on any other part adjacent to the said tool or to the said casing.

The invention includes various other features used together or separately, and which are as follows:

The rock cutting machine comprises at least one tool carrier placed in contact with and forming an extension of a device adapted to be actuated with a movement of longitudinal translation; a mechanism for driving the said device in its movement of translation; a tubular member rigidly connected with the said tool carrier and actuated with a movement of rotation; a mechanism for driving the said tubular member in its movement or rotation; a tubular casing arranged so as to be longitudinally displaceable at the same time as the tool carrier; a casing enclosing practically all these parts in their starting position; and an interchange tool fixed on the said tool carrier.

The device for driving the tool carrier in its movement of translation may consist substantially of a screw-threaded rod passing through a fixed nut mounted at the end of a tube, also fixed, enclosing the said screw-threaded rod, the latter comprising a longitudinal groove engaged by a slider rigidly connected with a rotary tube.

The screw-threaded rod adjacent its front end, is engaged in the rear part of the tool carrier where it is supported at its non-threaded end, in a ball bearing, in such conditions that the said screw-threaded rod can turn freely in relation to the said tool carrier but drives the latter in its movements of translation.

The rotary tube driving the screw-threaded rod is fitted, adjacent its rear end, with a gear wheel meshing with another gear wheel, the shaft of which carries a bevel gear fixed at the end of the shaft of an operating wheel.

The device for driving the tool carrier in rotation consists substantially of a motor, the shaft of which carries a bevel gear wheel meshing with a bevel gear ring fixed externally to a tube rigidly connected at its rear end to a second tube; this latter tube comprises an inner key engaging in the longitudinal groove of the tube rigidly connected with the tool carrier, in such a way that the double tube, directly driven by the motor device, the longitudinal position of which is fixed, drives in rotation the tube rigidly connected with the tool carrier whilst permitting this tube to be displaced longitudinally when driving the tool carrier.

These different features can be used in different ways, so that the rock cutting machine, according to the invention, may be adapted to the various kinds of work to be carried out.

Simply by way of example and without any limiting character a preferred constructional form will now be described in detail, with reference to the accompanying drawings, in which:

Figure 1 shows diagrammatically, in plan view, as simply as possible, the characteristic parts of the tool of a rock cutting machine made according to the invention;

Figure 2 illustrates diagrammatically the tool of the cutting machine in an advanced position;

Figure 3 is an enlarged view of the central part of Figure 2;

Figure 4 illustrates the impression produced by the tool of the machine;

Figure 5 is an enlarged view of the central part of Figure 4;

Figures 6 and 7, respectively illustrate diagrammatically in longitudinal section two characteristic positions of the rock cutting machine;

Figures 8 and 8a illustrate, in longitudinal section, one embodiment of the device shown in Figures 6 and 7;

Figure 9 is a section taken on line IX—IX of Figure 8;

Figure 10 is a radical section through the tool connected at the head of the cutting machine;

Figure 11 is a view in elevation of the tool of Figure 10 and

Figure 12 is a perspective view illustrating one particular embodiment of a rock cutting machine made according to the invention.

In the rock cutting machine shown in the drawings the tool carrier 1 properly so-called is fixed at the end of a tube 2 in any suitable manner, for example as shown in Figure 8 by means of a female end extension 4 of the said tool carrier 1 and screwed on to a union 3 which is welded to the end of the tube 2. The rear end of the tube 2 is fitted with an outer ring 5 held in position by a nut 6. The tube 2 communicates to the tool carrier 1—and in consequence also to the tool itself— its movement of translation in a longitudinal direction and its movement of rotation. The movement of longitudinal translation is produced by any suitable mechanism, for example by an arrangement in which the front smooth end 7 of a screw-threaded rod 9 extending over practically the whole length of the said tube 2 bears through the intermediary of a ball bearing 8 in the rear end of the tool carrier. This screw-threaded rod has, over the whole of its length, a groove 10 which is engaged by a slider 11 rigidly connected with the inner wall of the free end of a tube 12, the other end of which bears in the rear part of the casing 13 and terminates in a gear wheel 14 held in position at the end of the tube by a cheek 15. The gear wheel 14 meshes with a gear wheel 16 fixed by a cheek 17 at the end of a tubular shaft 18 which also bears at its two ends in the said casing 13. At its other end the tubular shaft 18 terminates in a bevel gear wheel 19 meshing with a bevel gear 20 mounted on a shaft 21 which terminates in a hand operated wheel 22. The threaded rod 9 engages, adjacent its front end, in a screw-threaded member 23 rigidly connected with the front part of a tube 24, the other end being held fixed as a result, for example, of being rigidly connected to the casing 13. The tube 2, rigidly connected with the tool carrier 1, is itself surrounded by a tubular casing 25, the rear end of which is disposed opposite to the ring 5, rigidly connected with the tube 2. The front end of this tube 25 is extended by a bush 26 in which is housed a bearing 27 for the tool carrier 1. The movement of rotation of this latter is produced by the following mechanism. The tube 2, fixed to the tool carrier, is fixed to rotate with an inner tube 28, which is extended rearwardly beyond the driving ring 5 and is, at this end, rigidly connected with an outer tube 29 by a ring connection 30. This outer tube 29 is guided, at its front end, by a ball bearing 31 mounted in the casing 13. Adjacent this end, the tube 29 carries a bevel gear ring 32 meshing with a bevel gear 33 mounted on a shaft 34 which bears in bearings 35, 36 in the frame. This shaft 34 is coupled to an electric motor 37. The casing 13 extends practically over the whole length of these various concentric tubes so as to enclose them and protect them in the starting position.

The tool comprises, in the example shown, a union and driving rod 38 engaged at its free grooved end in a female grooved part 40 of the tool carrier 1. At its other end this driving rod 38 terminates in a bevel gear 41 and, adjacent the said end, bears by means of a ball bearing 42 in a casing 43, the rear part of which is arranged for fixing on the bush 26 by means of screws 44. On the rear part of the casing 43 are fixed, for example by screws 46 two projections 45. The lateral dimensions of these projections are slightly less than the total lateral dimension of the tool. A transverse shaft 47 is mounted in bearings 48, 49 on the casing 43. This shaft projects on both sides of the casing and carries, on each side thereof, a disc cutter 50, 51 respectively. These two disc cutters are driven by the bevel gear 41 meshing with a second bevel gear 52 fixed on the shaft 47. Finally, a bevel gear 53 meshes with the bevel gear 52, the gear 53 being fixed at the end of a shaft 54 mounted on the casing 43 in bearings 55, 56. On the free end of this shaft is keyed the head tool 57 forming the feeding tool properly so-called and disposed in front of the disc cutters 50, 51. Finally, beyond the disc cutters 50, 51, small cutters 58, 59, respectively, are fixed on the shaft 47.

In operation, the tool of the machine thus constructed has imparted to it at the same time a movement of translation and a movement of rotation the operation being such that practically all the movable guiding and driving parts are permanently and completely protected by members which are developed at the same time as the machine support is drawn out, so as to make the protection permanent.

The operation of the mechanism for producing the movement of translation of the tool is as follows. The attendant turns the hand wheel 22 in a suitable direction, thus driving the bevel gears 20, 19, the gear wheels 16, 14 and the central tube 12. The slider 11 rigidly connected with the latter is engaged in the groove 10 of the screw-threaded rod 9 and drives this latter in the same movement of rotation whilst at the same time permitting it to screw into the nut 23 on the fixed tube 24. Whilst it is being screwed into this nut, or being unscrewed therefrom, the forward or rearward movement of the said screw-threaded rod drives the tool carrier 1, and in consequence, also the tool carried by this latter. At the same time as the tool carrier 1, the tube 2 with which it is rigidly connected is driven and drives, in its turn, through the annular abutment 5, the enclosing tube 25, which moves forward, therefor, at the same time as the tube 2 and the tool carrier 1.

This simple mechanism enables the forward or rearward movement of the tool to be effected under the complete control of the attendant, whilst practically all the support and driving members of the tool remain enclosed, irrespective of the position of the tool. The movement of rotation of this latter is effected independently of the movement of translation in the following way. The electric motor 37 drives the bevel gear 33 which, in turn, drives, through the bevel gear ring 32, the double tube 29, 28. The latter, being rigidly connected with the tube 2 fixed to the tool carrier, drives these two latter in rotation. The connection between the tube 28 and the tube 2 is of such a nature that they are rigidly connected for rotation but move independently in translation, this connection comprising a longitudinal groove in the tube 2 which groove is engaged by a key rigidly connected with the tube 28. The key thus enables the tube 28 to drive the tube 2 in rotation whilst at the same time permitting the latter to be displaced longitudinally, as above explained.

The rotation of the tube 2 drives the tool carrier 1 and, in consequence, the shaft 54. The bevel gears 41, 52, 53 are thus driven and drive, in their turn, the two disc cutters 50, 51 and the head tool 57. All these movements of rotation can be effected whilst the tools are moving progressively forwards.

As will be evident when the tool of the machine advances into the mass to be operated on, the two small lateral cutters 69, 59 cut two parallel grooves 60, 61 in which the lateral projections 45 immediately engage, thus providing direct supports for the tool, whilst systematically avoiding overhang of the latter.

It will also be evident that a compact construction is obtained enabling operations at relatively substantial depths to be carried out, whilst at the same time retaining a good stability for the tool and a practically total protection in all positions of the tool for the movable parts of the apparatus.

Obviously it is possible to modify the construction described by providing other driving means, or by modifying the dimensions and relative positions of the different parts of the machine. The casing 13 itself could be mounted on any kind of support, frame, column, carriage or the like. If desired the feed movement of the tool could be made automatic. To this end it is only necessary to drive the gear wheel 14 of the tubular shaft 12 by a motor through the intermediary of an adjustable speed reducing device; such an arrangment would obviously only be required in the case of cutting rocks of great hardness or in particular kinds of workings. The same mechanism could also be used for driving other kinds of tools which are to be actuated at the same time with movements of rotation and translation.

As shown diagrammatically in Figure 12, the machine could easily be mounted on a column 62 which can be fixed in position by clamping its two ends 63, 64, respectively between two fixed supports. The rock cutting machine properly so-called is suspended at the top end of the column 62 by means of a pulley 65 and a cable 66. By a simple winch device, operable for example by a crank 67, it is possible to move the machine along the column 62. The attendant can stand on a platform 68 suspended from the machine properly so-called, and thus be kept in a regular position in relation to the operating members, in particular the crank 67 and the operating wheel 22.

The invention includes the devices described and also all apparatus, machines and plants making use thereof.

A machine made according to the invention provides not only for attaining great depths whilst at the same time providing a good stability for the machine, but enables the cutters to operate just as well in a vertical plane as in a horizontal plane, and in any intermediate angular position. The position of the cutters can thus be adapted to the work to be carried out. Similarly, a machine according to the invention permits of operating in drifts and the like without underpinning, since the blocks are cut on their four side surfaces and the mass can be acted on directly without any preliminary work. The cutters, as well as the guiding and driving members, will obviously be suited to the nature of the stony material to be cut, and to the kind of work to be carried out.

Means other than those described for supporting and driving the apparatus can be provided.

What I claim is:

1. In a rock cutting machine a cutter head, two lateral main cutters on opposite sides of said cutter head, a shaft carrying said lateral main cutters, an auxiliary cutter mounted on the side of the cutter head upon an end of said shaft, a fixed projection mounted on the side of said machine behind and substantially in alignment with said auxiliary cutter, said auxiliary cutter being adapted when said machine is operating to cut a groove in the material acted upon, said projection being adapted to engage in said groove thereby providing a guide and support for said cutter head.

2. In a rock cutting machine a cutter head, two lateral main cutters on opposite sides of said cutter head, a shaft carrying said lateral main cutters, two auxiliary cutters mounted respectively on opposite sides of said shaft, two fixed projections mounted on the side of said machine, said projections being respectively disposed behind and substantially in alignment with said two auxiliary cutters, said auxiliary cutters being adapted when said machine is operating to cut grooves in the material acted upon, said projections being adapted to engage respectively in said grooves, thereby providing guiding and supporting means for said cutter head.

3. In a rock cutting machine, a cutter head comprising a head tool and two cutters discs disposed respectively in horizontal planes on opposite sides of said head tool, a shaft carrying said cutter discs, and means for advancing the cutter head horizontally and rotating said head tool and said cutter discs, two auxiliary cutters disposed respectively on opposite ends of said shaft, two fixed projections mounted on opposite sides of said machine and disposed respectively one behind, and in line with, each of said auxiliary cutters, said auxiliary cutters being adapted when said machine is operating to cut grooves in the material acted upon, each of said projections engaging in one of said grooves, thereby providing upwardly and downwardly directed guiding means for each of said projections and supporting means for said cutter head.

4. In a rock cutting machine, a cutter head comprising a head tool and two cutter discs disposed respectively in horizontal planes on opposite sides of said head tool, a carrier connected with said head tool, a shaft carrying said cutter discs for rotating said discs about an axis perpendicular to the axis of said tool, means connected with said carrier for imparting thereto a longitudinal horizontal movement of translation, a tubular member rigidly connected to said carrier, means for rotating said tubular member to rotate said carrier, two auxiliary cutters disposed respectively on the ends of said shaft, two fixed projections mounted on opposite sides of said machine and disposed respectively one behind, and in line with, each of said auxiliary cutters, said auxiliary cutters being adapted, when said machine is operating, to cut grooves in the material acted upon, said projections engaging respectively in said grooves thereby providing upwardly and downwardly directed guiding means and supporting means for said cutter head during the relative movement of said cutter discs.

5. A rock cutting machine according to claim 4 in which said means for imparting said longitudinal movement of translation to said carrier comprises a screw-threaded rod rotatably connected at one end to said carrier, a nut engaged by said screw-threaded rod, a slider engaging in a longitudinally extending groove in said screw-threaded rod, a rotatable tube to which said slider is rigidly connected, and means for rotating said tube, whereby said screw-threaded rod is rotated and moves to and fro in said nut.

6. A rock cutting machine according to claim 4 in which said means for imparting said longitudinal movement of translation to said carrier comprises a screw-threaded rod rotatably connected at its front end to the rear end of said carrier, a ball bearing in which said front end of said screw-threaded rod is supported to enable said rod to turn freely relatively to said carrier, a nut engaged by said screw-threaded rod, a slider engaging in a longitudinally extending groove in said screw-threaded rod, a rotatable tube to which said slider is rigidly connected, and means for rotating said tube to effect a longitudinal movement of translation of said screw-threaded rod in and out of said nut.

7. A rock cutting machine according to claim 4 in which said means for imparting said longitudinal movement of translation to said carrier comprises a screw-threaded rod connected to said carrier, a fixed nut engaged by said screw-threaded rod, a slider engaging in a longitudinally extending groove in said screw-threaded rod, a rotatable tube to which said slider is rigidly connected, and means for rotating said tube comprising a gear wheel fixedly mounted on said rotatable tube, an operating wheel operatively connected to a bevel gear, a transmission shaft between said bevel gear and said gear wheel, and gear wheels on said shaft, meshing with said bevel gear and said gear wheel on said rotatable tube.

8. A rock cutting machine according to claim 4 in which said means for rotating said tubular member to rotate said carrier comprises a motor, a shaft driven by the motor, and a transmission comprising inner and outer tubes rigidly connected together at their rear ends and fixed against longitudinal displacement, gearing operatively connected between said driven shaft and said outer tube, a key fixed to said inner tube and engaging in a longitudinal groove in said tubular member, whereby the latter whilst rotating to drive said cutter head can also be displaced longitudinally with said carrier.

9. A rock cutting machine according to claim 4 in which said means for rotating said tubular member to rotate said carrier comprises a motor, a shaft driven by the motor and a transmission comprising inner and outer tubes rigidly connected together at their rear ends and fixed against longitudinal displacement, gearing operatively connected between said driven shaft and said outer tube, a ring fixed on the outside of said tubular member and constituting a driving abutment for said outer tube, a key fixed to said inner tube and engaging in a longitudinal groove in said tubular member, whereby the latter whilst rotating to drive said cutter head can also be displaced longitudinally with said carrier.

10. A machine according to claim 4 in which said cutter head comprises a casing, a first shaft mounted in said casing and adapted to be fixed to said carrier as an axial extension thereof, a second shaft mounted in said casing perpendicularly to said first shaft, the ends of said second shaft projecting beyond the sides of said casing to enable said disc cutters to be mounted thereon, a third shaft forming an axial extension of said first shaft, said head tool being fixedly mounted on the front end of said third shaft so as to project in front of said disc cutters and gearing suitably disposed between said shafts to enable said first shaft to drive said second and third shafts.

References Cited in the file of this patent

UNITED STATES PATENTS 513,296    Beury et al. _____ Jan. 23, 1894

(Other references on following page)

UNITED STATES PATENTS

| | | | |
|---|---|---|---|
| 773,882 | Millward | Nov. 1, | 1904 |
| 825,857 | Moran et al. | July 10, | 1906 |
| 1,653,111 | Lobbey | Dec. 20, | 1927 |
| 1,674,870 | Morgan | June 26, | 1928 |
| 1,934,562 | Robbins | Nov. 11, | 1933 |
| 1,956,129 | Mueller et al. | Apr. 24, | 1934 |
| 2,284,758 | Morton et al. | June 2, | 1942 |

FOREIGN PATENTS

| | | | |
|---|---|---|---|
| 1,006,435 | France | Jan. 23, | 1952 |